US006280782B1

(12) United States Patent
Hahn et al.

(10) Patent No.: US 6,280,782 B1
(45) Date of Patent: Aug. 28, 2001

(54) NON-EMULSION BASED, MOISTURE CONTAINING FILLINGS FOR DOUGH PRODUCTS

(75) Inventors: Patricia W. Hahn, Plymouth; Victor T. Huang, Moundsview; Doug L. Goedeken, Blaine; RoseBud L. Sierzant, Minneapolis, all of MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/436,307

(22) Filed: Nov. 8, 1999

(51) Int. Cl.⁷ .............................. A21D 13/00; A21C 9/06
(52) U.S. Cl. .............................. 426/94; 426/95; 426/653; 426/660; 426/573; 426/578; 426/496
(58) Field of Search ................................ 426/94, 95, 653, 426/573, 578, 660, 496

(56) References Cited

U.S. PATENT DOCUMENTS

| 3,185,576 | 5/1965 | Ross ......................................... 99/129 |
| 3,352,688 | 11/1967 | Messina .................................. 99/131 |
| 4,234,611 | * 11/1980 | Kahn et al. ........................... 426/321 |
| 4,670,272 | 6/1987 | Chen et al. ............................. 426/94 |
| 4,693,728 | 9/1987 | Clare et al. ............................. 8/561 |
| 4,721,622 | 1/1988 | Kingham et al. ...................... 426/94 |
| 4,774,095 | * 9/1988 | Kleinschmidt et al. ............... 426/94 |
| 4,859,208 | 8/1989 | Clare et al. ............................. 8/557 |
| 5,059,433 | 10/1991 | Lee et al. ............................... 426/94 |
| 5,356,673 | 10/1994 | Lathrop ................................ 426/573 |
| 5,368,877 | 11/1994 | Huang et al. ......................... 426/589 |
| 5,560,946 | * 10/1996 | Sanders et al. ........................ 426/94 |
| 5,989,603 | * 11/1999 | Lonergan et al. ..................... 426/94 |

FOREIGN PATENT DOCUMENTS

| 0 940 089 | 9/1999 | (EP) . |
| 63-240747 | 10/1988 | (JP) . |

OTHER PUBLICATIONS

Vincent et al., "Alginates for Applications in Bakery Foods", *Food Technology in New Zealand,* Nove 1992, pp. 14–17.
Wells, "Alginates and Gellan Gum in Bakery Fillings", *Kelco International,* United Kingdom, p. 212–.
Winwood et al., Application of Sodium Alginate and Low Methoxy Pectin as a Bakestable Fruit Fillin *Research Disclosure,* Aug. 1993, p. 529.
International Search Report PCT/US00/30080.

* cited by examiner

Primary Examiner—Nina Bhat
(74) Attorney, Agent, or Firm—Kagan Binder, PLLC

(57) ABSTRACT

Non-emulsion based, moisture containing fillings for dough products and dough products incorporating the filling, are provided. In particular, the fillings comprise at least two water activity impacting ingredients so that the water activity of the filling can be adjusted, e.g., as by the incorporation of moisture, so as to be substantially equivalent to the water activity of the dough into which the filling is to be incorporated to provide a dough product in accordance with the present invention. By reducing the differential in water activities between the dough and the filling, moisture migration between the filling and the dough can be reduced or eliminated so that when the dough product is baked or otherwise cooked, a baked dough product with excellent visual and organoleptic properties is produced, even after prolonged periods of storage.

33 Claims, No Drawings

NON-EMULSION BASED, MOISTURE CONTAINING FILLINGS FOR DOUGH PRODUCTS

FIELD OF THE INVENTION

This invention relates to moisture containing fillings for dough products, and dough products comprising the fillings. In particular, the invention relates to such fillings and dough products where moisture migration between the filling and the dough can be reduced, or even eliminated. As a result, the filling can be in contact with raw dough for a prolonged storage period, i.e., as is anticipated for refrigerated or frozen dough products, and yet a substantial degradation in product quality of the filling, dough or overall dough product is not observed in either the raw state of the dough product, or even once the dough product has been cooked.

BACKGROUND OF THE INVENTION

Refrigerated dough products have been popular for many years and are highly desired not only due to their taste and the dietary satisfaction that is achieved by consuming them, but also, because the preparation of such products, particularly within a home environment, can serve many useful and/or desirable functions. First of all, refrigerated dough products are convenient. In most cases, consumers can prepare fresh baked goods in the home in a matter of minutes simply by unwrapping, separating and baking the dough products. Secondly, the preparation of such dough products can serve to provide entertainment for those who enjoy cooking these items, a sense of satisfaction to those who enjoy preparing such items, and furthermore, can create a comfortable, "homey" atmosphere by virtue of the aroma that is produced when these items are baked.

Many refrigerated dough products contain fillings within the dough, e.g., cinnamon or fruit fillings, which are desirably moist in appearance and taste. However, including an amount of moisture, i.e., in the form of water, fruit juice, or other consumable liquid, necessary to impart these desirable characteristics to the filling presents many difficulties to the manufacturer of such products. That is, fillings with a high moisture content typically will have a low viscosity and will tend to be very fluid, rendering them difficult to apply to dough products in a manufacturing setting. Furthermore, once so applied, the filling can impart a slipperiness to the dough product, and thus, can make it difficult to form the dough into shapes around the filling. Finally, once packaged, these dough products are typically stored for relatively long periods of time, i.e., during transport from the manufacturer to the retail environment, retail shelf time, and in storage at the end user facility. Such long periods of storage are generally not well tolerated by dough products including a high moisture filling, as the moisture has a tendency to migrate between the filling and the dough and/or into the packaging. Moisture migration between the filling and the dough can adversely affect the quality of the filling, as well as the dough, and thus, the overall dough product quality can suffer.

In addition to the problems that dough products including such desirable high moisture fillings present to the manufacturer of such products, such dough products can also prove problematic for the end-user to prepare and/or once so prepared, can result in suboptimal baked dough products. That is, moisture migration from the filling into the packaging can result in liquid pooling within the packaging which, in turn, can render the dough product slippery and difficult for the end-user to handle. Additionally, when these dough products are baked, further moisture migration may result in a degradation of the quality of the filling, as well as in the quality of the baked product surrounding the filling.

In order to address these difficulties, while yet providing a dough product with the desired product attributes, several attempts have been made to provide stable fillings that are yet moist in taste and appearance. For example, several attempts have focused on providing fillings with no moisture, instead incorporating a relatively high amount of fat in efforts to concurrently provide the desirable taste, texture and appearance, while also addressing the handling and storage issues that high moisture fillings can present when incorporated into dough products. Although such fillings can be effectively incorporated into dough products that are desirably stored for prolonged periods and in fact, provide such dough products with satisfactory organoleptic qualities, the organoleptic properties of these fillings could yet be improved. That is, the exclusion of moisture from these fillings can result in the filling having a somewhat dry taste or appearance, which in turn can result in a consuming experience that is less than ideal.

Additional efforts to provide fillings sith shelf-life stability and bake stability for use in dough products have focused on the inclusion of gelling agents, e.g., gums and starches, into fillings to be used in applications where shelf-life stability and/or bake stability is required or desired. For example, U.S. Pat. No. 3,185,576 issued to Ross, U.S. Pat. No. 3,352,688 issued to Messina and U.S. Pat. No. 4,670,272 issued to Chen et al, as well as Japanese Patent Application No. Sho 62-79147 describe shelf and/or bake stable bakery fillings comprising an amount of at least one gum, alone or in combination with an amount of one or more starches. More specifically, each of these disclosures teach including amounts of such gelling agents and/or starches effective to form a viscous matrix intended, in turn, to be effective to reduce or eliminate moisture migration between the dough and the filling. However, the utilization of only such gelling agents, either alone or in combination, is often not effective to substantially reduce, or eliminate, moisture migration and as a result, dough products incorporating such fillings are not as stable to moisture migration as would be desirable in applications where prolonged storage of the dough product is contemplated.

Additionally, the inclusion of such gelling agents tends to give the resulting filling the consistency of a jelly, which can result in the filling being difficult to apply to dough products in a manufacturing setting. Furthermore, while a jelly consistency can be desirable in some applications, in others it would be desirable to have a filling with a creamy, rather than a gelled, texture. Such a creamy texture can be difficult to achieve when using such gelling agents, a difficulty that is well illustrated by the disclosure of Chen. In particular, Chen et al teach the formation of a creme filling using such a gelling agent, however, in order to provide a creamy texture the filling must be cooked and aerated. The addition of such steps to a manufacturing process can not only undesirably add complexity to the process and lengthen the processing time, but also can introduce additional cost in the form of the additional equipment required to perform such steps.

Yet other attempts to provide dough products including fillings with shelf life stability and bake stability, have focused on the development of emulsion based fillings, i.e., either water-in-oil or oil-in-water emulsion based fillings, that exhibit the desirable organoleptic qualities of moistness, thickness and stickiness while yet being capable of being incorporated into dough products without substantially detrimentally affecting the dough structure, even after periods of prolonged storage. One such filling is described in co-pending commonly assigned U.S. patent application Ser. No. 08/782,461. It is thought that such fillings are effective in filled dough applications due at least in substantial part to the fact that a continuous, oil phase of such fillings can act to substantially "enrobe", a dispersed, aqueous phase, thereby preventing the interaction of the moisture, or any dough antagonistic ingredients such as sugar or flavorings that may be incorporated therein, with the surrounding dough. While these fillings can thus be used to provide baked, filled dough products with excellent visual and organoleptic properties, emulsion-based fillings can be difficult to manufacture and handle. That is, specialized manufacturing equipment is typically needed to prepare emulsions, and once formed, emulsions can be unstable, thus requiring special handling equipment keep the emulsion intact.

Thus, there is a need for stable, moist fillings for use in dough products, and in particular, for use in dough products that are desirably stored for prolonged periods of time. Such fillings, although desirably including an amount of moisture so as to provide them with pleasing organoleptic characteristics, would desirably not exert a substantial negative effect on the surrounding dough product during prolonged periods of storage and subsequent baking. Additionally, such fillings would desirably be readily and easily manufactured without requiring the utilization of specialized manufacturing equipment, and furthermore, would desirably have handling properties that allow them to be readily and easily incorporated into a variety of dough products.

SUMMARY OF THE INVENTION

According to the present invention, the above objectives and other objectives apparent to those skilled in the art upon reading this disclosure are attained by the present invention which is drawn to non-emulsion based, moisture containing fillings and dough products incorporating these fillings. Specifically, the fillings of the present invention comprise at least two water activity-impacting ingredients, one of which is desirably fat, so that the water activity of the fillings can be adjusted to be substantially equivalent to the water activity of the dough with which the filling is to be utilized to form a dough product. By rendering the water activities between the filling and the dough substantially equivalent, i.e., by reducing the differential between these two water activities, the moisture migration that may otherwise occur between the fillings and the dough and/or the packaging of the dough products can be reduced or even eliminated. As a result, not only are the fillings desirably moist in taste and appearance, but the fillings can also be incorporated into dough products that are desirably stored for a prolonged period of time. Moreover, even after prolonged periods of storage, the quality of the filling and/or the dough is not substantially detrimentally affected.

In accordance with the present invention, it is possible to select and proportion ingredients to thus adjust the water activity of a filling so that the filling of the present invention can be utilized in a dough product where the water activity of the filling is adjusted to result in a low water activity differential between the filling and the dough utilized in the dough product, thereby substantially reducing, or even eliminating moisture migration between the filling and the dough. A reduction in moisture migration, in turn, results in a dough product that is not only more stable over prolonged storage periods, but also that produces a dough product with excellent visual and organoleptic properties when cooked.

Thus, in one aspect of the present invention, there is provided a filled dough product and method of producing the filled dough product. Specifically, the filled dough product comprises a dough having a first water activity; and a non-emulsion based, moisture containing filling comprising at least two water activity impacting ingredients and having a second water activity. The at least two water activity impacting ingredients are selectively proportioned to one another so that the differential between the first water activity and the second water activity is desirably less than about 0.25, preferably less than 0.2, more preferably less than about 0. 15. Also provided is a method of developing a formulation for a filling that is to be utilized in such a dough product. Specifically, the method comprises the steps of determining the water activity of a dough which is to be combined with the filling to provide the dough product and selecting a plurality of ingredients for the filling. At least two of the plurality of ingredients are then proportioned to adjust the water activity of the filling so that the differential between the water activity of the dough and the water activity of the filling is about 0.25 or less.

It has now been discovered that a variety of ingredients suitable for use in filling applications can have an impact on the water activity of the filling. It has further been discovered that by selectively proportioning at least two of such water activity impacting ingredients in a filling, that a filling with excellent organoleptic properties can be prepared that yet is suitable for use to prepare filled dough products that are desirably stored for prolonged periods of time. Desirably, one of the at least two water activity impacting ingredients is fat due to the desirable organoleptic properties that can be imparted to the filling by virtue of its inclusion. As a result, in another embodiment of the present invention there is provided a non-emulsion based, moisture containing filling for a dough product comprising from about 20% to about 60% fat and at least one other water activity impacting ingredient so that the filling has a water activity of at least about 0.725. Also provided is a filled dough product incorporating the filling.

As used herein, the phrase "water activity" or "Aw" with respect to a filling, a dough, or a dough product, is meant to indicate the ratio of the vapor pressure of the filling, dough or dough product, to the vapor pressure of pure water at any given temperature. Thus, pure water has a water activity of 1. Water including any other component, such as sugar or salt, will have a water activity of less than 1. Water activity can be measured by, e.g., enclosing the sample desirably measured in an enclosed space. Once equilibrium is reached, the relative humidity above the sample can be measured, which measurement is indicative of the water activity of the sample. Such measurements can be made, e.g. as by a water activity meter such as that commercially available from Decagon Devices, Inc., Pullman, Wash.

Also as used herein, the phrase "substantially equivalent" as used in conjunction with the water activities of a filling in accordance with the present invention and a dough, is meant to indicate that a low differential, e.g., less than about 0.25, exists between the water activities. Additionally, the phrase "water activity-impacting ingredient" is meant to indicate an ingredient that, by virtue of its inclusion in the fillings of the present invention, can act, either directly or indirectly, to alter the water activity of the filling. That is, in some instances, as is the case with sugar, the inclusion of the ingredient will itself act to alter, and typically lower, the water activity of the filling, while in others, the inclusion of the ingredient, e.g., as is the case with fat or a viscosity controlling agent, allows for the inclusion of a greater amount of moisture which in turn has the effect of raising the water activity of the filling. Both ingredients that act directly, as well as those that act indirectly, to impact the water activity of the filling are considered to be within the scope of the term "water-activity impacting ingredient." Finally, the phrase "organoleptic properties" as used herein is meant to indicate those properties, whether visual, textural or taste properties that contribute to the overall quality of a dough product. For example, organoleptic properties are typically meant to include such properties as taste, color, smell, texture, shape, appearance, mouthfeel, smoothness, and the like.

All percentages used herein are weight percentages, and are based on the total weight of the filling unless otherwise indicated.

DETAILED DESCRIPTION OF THE INVENTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The present invention provides non-emulsion based fillings and dough products incorporating the fillings that are extremely stable. In particular, the fillings of the present invention comprise at least two water activity impacting ingredients, one of which is desirably as an amount of fat, so that the water activity of the fillings can be adjusted to be substantially equivalent to the water activity of a dough with which the fillings are to be utilized to provide dough products. By forming a dough product from a filling and a dough with substantially equivalent water activities, moisture migration within, or out of, the dough product is discouraged so as to be substantially reduced or eliminated. That is, there is a reduced tendency for moisture to migrate between the filling and the dough in efforts to achieve an equilibrium state. As a result of the reduction or elimination of moisture migration, a filling having a desirable moisture level can be made where the product quality of the filling, the dough and dough product is not substantially degraded, and in fact, can remain substantially unchanged during storage and subsequent cooking. Thus, when the dough product is cooked, a baked dough product with excellent visual and organoleptic properties can be obtained.

The moisture migration that typically occurs in conventional filled dough products between the filling and the dough occurs at least in part due to the relatively large differential, i.e., 0.25 or greater, that typically exists between the water activity of the dough and the water activity of the filling. When such a high differential exists, moisture will have a greater tendency to migrate between the dough and the filling in a manner similar to the manner in which the concentration of a gas in solution will come to equilibrium with the concentration of gas above the solution when in a closed environment.

In this regard, it has now been discovered that many ingredients otherwise suitable for use in fillings for dough product can have an impact on the water activity of the filling into which they are incorporated. Such an impact can be direct, i.e., the inclusion of the ingredient itself can have the effect of altering, typically lowering, the water activity of the filling. Alternatively, the impact may be indirect, i.e., the inclusion of the ingredient can interact with the filling in such a manner that additional ingredients, or greater amounts of ingredients already in the filling, can be added to the filling which, in turn, have an impact on the water activity of the filling. The inclusion of both direct and indirect ingredients allows the water activity of the filling to be adjusted in order to minimize the differential between the water activity of the filling and the water activity of the dough with which the filling is to be used to provide a dough product, thereby reducing the moisture migration that may otherwise occur between the filling and the dough.

Thus, any ingredients capable of directly or indirectly impacting the water activity of a filling are suitable for use in the fillings of the present invention. Ingredients capable of having an impact on the water activity of a filling include, but are not limited to, moisture containing ingredients, such as water, milk, or juice, as well as ingredients provided in solution with such ingredients; viscosity controlling agents, sugars, fats, polyols such as glycerol, ethanol, propylene glycol, sorbitol, xylitol or erythritol, salts and the like. Preferably, the water activity impacting ingredients will be selected from viscosity controlling agents, fats, sugars or a combination thereof The fillings of the present invention desirably comprise at least two such water activity impacting ingredients, and furthermore, desirably comprise fat as one of the water activity impacting ingredients. Fat is one example of an indirectly acting water activity impacting ingredient. That is, fats can act to form a physical barrier against moisture migration, thus allowing the inclusion of an amount of, or greater amounts of, moisture or moisture-containing ingredients in the fillings of the present invention.

The fat(s) to be utilized in the fillings of the present invention is not particularly restricted, but rather, any fat, or combination of fats, capable of acting as a physical barrier to moisture migration is suitable for use in the present inventive fillings. The fat can be derived from any animal or plant source. One exemplary fat that has been found to be particularly well suited for use in the fillings of the present invention is partially hydrogenated vegetable shortening, but the invention is not so restricted and the fat component may also be and/or include other shortenings, margarine, butter or oils.

The use of fat in the fillings of the present invention as a water activity impacting ingredient is particularly preferred not only due to the ability of fat to act as a moisture migration barrier, but also because the inclusion of fat can provide the fillings with advantageous handling properties and organoleptic characteristics typically not attainable in fillings not comprising such an amount of fat. In particular, whereas fillings that are rendered stable by the inclusion of only an amount of a gelling agent, e.g., a gum or a starch, can be extremely stiff and thus difficult to apply to a dough product, the fillings of the present invention have a consistency that allows them to be readily and easily applied to dough products by the manufacturer of such dough products without the need for specialized equipment, i.e., temperature controlling devices such as cooling tunnels and the like. Additionally, the inclusion of an amount of fat renders the fillings with a desirable creamy texture that is not only pleasing to the taste, but is also visually pleasing, and that is not attainable in fillings that comprise only an amount of a gelling agent. Due to the creamy rather than liquid nature of the filling, the application of the filling to the dough does not result in the dough becoming difficult to handle or package, i.e., the dough product is not rendered substantially slippery due to the application of the filling.

The amount of fat desirably included in the fillings of the present invention is that amount of fat that is capable of providing a physical barrier to moisture migration while also providing a filling with the aforementioned handling and organoleptic characteristics. Generally speaking, enough of the fat should be included so as to at least minimally produce the desired effect, i.e., to at least reduce the moisture migration that would otherwise occur within the dough product and/or to impart a creamy texture to the filling. On the other hand, not so much fat should be included so that the handling or organoleptic characteristics of the filling are substantially negatively impacted, e.g., so that the filling becomes to stiff, or has an undesirable mouth feel. The fat will also desirably be included in an amount effective to allow the fat to provide a barrier to moisture migration thereby allowing more moisture to be incorporated into the filling, which in turn, will desirably at least minimally raise the water activity of the filling. Bearing these considerations in mind, and for illustrative purposes only, the fat is desirably included in the filling in an amount of from about 20% to about 60%, more preferably from about 30% to about 50%, and most preferably from about 35% to about 45%.

Viscosity controlling agents are an additional class of an ingredient that indirectly impacts the water activity of the filling. That is, suitable viscosity controlling agents are capable of interacting or binding with water to form a colloidal mass or gel. As a result, additional moisture may be added to the fillings of the present invention, which moisture will not only have the impact of desirably raising the water activity of the filling, but also can advantageously impart a moist appearance, taste and texture to the filling.

In one preferred embodiment of the present invention, the filling thus comprises, in addition to the amount of fat, an amount of one or more viscosity controlling agents. The particular viscosity controlling agent(s) to be utilized is not particularly restricted, but rather, any viscosity controlling agent capable of binding water to from a colloidal mass or gel, while not otherwise detrimentally affecting the organoleptic or handling characteristics of the filling, is suitable for use in the filling of the present invention. Exemplary viscosity controlling agents suitable for use in the present invention include, but are not limited to, hydrocolloid gums; gel-forming proteins such as gelatin; natural or modified starches; combinations of these and the like. Preferably, the viscosity controlling agent(s) utilized in the fillings and dough products of the present invention will be a hydrocolloid gum, such as, e.g., gellan gum, tara gum, guar gum, locust bean gum, agar, alginate, carrageenan, gum arabic, gum ghatti, gum karaya, gum tragacanth, xanthan gum, carboxymethyl cellulose, methyl cellulose, hydroxypropyl cellulose, hydroxypropylmethyl cellulose, and the like. Due to the desirable organoleptic properties provided to the filling of the present invention by virtue of its inclusion, one example of a particularly preferred hydrocolloid gum for use in the filling of the present invention is alginate.

The amount of the viscosity controlling agent to be utilized in the filling will, of course, depend upon the particular viscosity controlling agent chosen and nature of the dough product desirably being prepared. As a lower limit, at least enough of the viscosity controlling agent is desirably included to at least minimally produce the desired effect, i.e., to interact with, or form a barrier to, at least a portion of the moisture in the dough and/or filling. As an upper limit, not so much of the viscosity controlling agent should be included in the filling so that the handling properties of the filling are substantially negatively impacted, e.g., the amount of viscosity controlling agent(s) included would desirably not result in the filling being too stiff to readily and easily apply the filling to a dough product.

Additionally, the viscosity controlling agent(s) will also desirably be included in an amount effective to allow the viscosity controlling agent to interact with moisture in the filling in a manner so as to inhibit moisture migration, thereby allowing more moisture to be incorporated into the filling, which in turn, will desirably at least minimally raise the water activity of the filling. Bearing these considerations in mind, and for exemplary purposes only, the amount of viscosity controlling agent to be included in the filling desirably ranges from about 0.1% to about 5%, preferably from about 0.25% to about 4% and more preferably from about 0.4% to about 3%.

The use of one or more viscosity controlling agent(s) as the second water activity impacting ingredient in the fillings of the present invention is further advantageous in that the amount of viscosity controlling agent can be advantageously and desirably varied in order to provide fillings with varying visual and organoleptic properties appropriate for different applications. For example, in those applications where the filling within a dough product desirably has a "high-coverage appearance", i.e., an indefinite visual boundary between the filling and the dough is desired, and in that embodiment of the invention wherein the viscosity controlling agent is alginate, such a filling can be provided by including the alginate in the filling in an amount of from about 0.5% to about 0.75%. Alternatively, in those applications wherein a more gel-like filling, capable of forming ribbons and of providing a clear definition between the dough and the filling is desired, and in that embodiment of the invention wherein the viscosity controlling agent is alginate, such a filling can be provided by including the alginate in the filling in an amount of at least about 2%.

Yet another example of a particularly preferred water activity impacting ingredient that is desirably and advantageously included in the fillings of the present invention is sugar. Sugar is an example of a direct water activity impacting ingredient, i.e., the inclusion of sugar in the fillings itself has the effect of altering the water activity of the fillings. Sugars also advantageously function to add flavor and/or sweetness to the fillings of the present invention. The particular type of sugar utilized in the fillings of the present invention is not particularly restricted, but rather, any of a variety of edible oligosaccharides having one, two or more saccharide groups, e.g., sucrose, fructose, maltose, dextrose, lactose, galactose, and mixtures thereof, are suitable for use in the fillings of the present invention. These oligosaccharides can be used in any of a variety of conventional forms, such as cane sugar, beet sugar, corn syrup solids, brown sugar, maple sugar, molasses, and invert sugar. Preferably, the sugar utilized is selected from the group consisting of sucrose, fructose, dextrose, maltose and mixtures thereof, more preferably, the sugar is sucrose, dextrose or a combination of these.

One example of a particularly preferred sugar for use in the present inventive fillings is dextrose monohydrate (hereinafter referred to as "dextrose"). Relative to other sugars which typically were found to lower the water activity of a filling in accordance with the present invention, dextrose has actually been found to advantageously raise the water activity of the present inventive fillings relative to sucrose. Additionally, the use of dextrose is preferred inasmuch as it can provide the fillings with a glossy sheen, thereby giving the fillings a moist appearance.

The amount of the sugar to be included in the present inventive fillings will depend on the particular sugar or sugars to be utilized, which, in turn, can depend on the intended application of the filling. That is, the fillings of the present invention may be formulated so as to be useful in a variety of different applications, i.e., so as to be useful as sweet filling, such as for use in a cinnamon roll or a Danish; a savory filling, such as for use in cheese bread; or as a fruit filling, such as for use in a Bismarck. Obviously, a savory filling desirably has a flavor that is less sweet than fruit or sweet fillings, and as a result, these types of fillings typically utilize corn syrup solids as a sweetener in relatively low amounts. Generally speaking then, enough of the sugar should be provided so that the filling has the desired flavor and level of sweetness. On the other hand, not so much of the sugar should be included so that the flavor or handling characteristics of the filling are substantially detrimentally affected. Additionally, the amount of sugar utilized will preferably be an amount that influences the water activity of the inventive fillings as determined in combination with other ingredients. Bearing these considerations in mind, sugar is desirably included in amounts ranging from about 10% to about 50%, more preferably ranging from about 20% to about 40%.

The aforementioned water activity impacting ingredients, although each potentially capable in some amount of having an impact on the water activity of the fillings of the present invention, are desirably used in combinations of two or more, and in particular, are desirably used in combinations of two or more wherein one of the water activity impacting ingredients is fat. Furthermore, the two or more water activity impacting ingredients are desirably selectively proportioned so that the water activity of the resultant filling is at least about 0.725. That is, inasmuch as many if not most doughs have a water activity of about 0.90 or greater, it is thought that providing a filling with a water activity of at least about 0.725 will be at least minimally effective to reduce or eliminate moisture migration between the dough and the filling.

Thus, and also in accordance with the present invention, there is provided a method of developing a formulation a filling for a dough product that involves selecting and proportioning ingredients of the filling so that the differential between the water activity of the filling and the water activity of a dough with which the filling is to be utilized to provide a dough product is minimized. That is, the water activity of the desired dough can be determined, and the appropriate ingredients selected for the filling. The selection of the particular dough and ingredients will depend on the dough product desirably being prepared. The ingredients of the filling are then selectively proportioned to one another until the desired water is achieved, i.e., so that the differential between the water activity of the dough and the water activity of the filling is about 0.25 or less Furthermore, utilizing the water activity impacting ingredients in combinations of two or more can provide many advantageous organoleptic properties to the fillings and dough products of the present invention. That is, and for example, although one or more viscosity controlling agents may be capable of altering the water activity of the fillings of the present invention, the one or more viscosity controlling agents are desirably and preferably utilized in combination with an additional water activity impacting ingredient, e.g., with either or both of the fat and the sugar, to achieve a filling that is not only shelf and/or bake stable, but that also exhibits the other organoleptic properties often desired in fillings, e.g., a creamy taste, texture and appearance, and a sweet or savory flavor.

In this regard, the effective amounts given hereinabove are given in contemplation of the fact that the water activity impacting ingredients are desirably used in such combinations of two or more, and the particular amounts of each to be used in a particular filling will depend upon the combination of water activity impacting ingredients chosen and the desired application. For exemplary purposes only then, and in that embodiment of the invention where a sweet filling is desired and wherein the water activity impacting ingredients are fat and the hydrocolloid gum alginate, a filling with excellent visual and organoleptic characteristics can be obtained by using 35% fat and from about 0.5% to about 2% alginate, in combination with other conventional filling ingredients. As an additional example, and in that embodiment of the invention wherein fat and a sugar are desirably used as the water activity impacting ingredients in a filling that is desirably sweet, a filling with excellent visual and organoleptic properties can be obtained by utilizing 25% dextrose and 45% shortening in addition to other conventional ingredients commonly used in such fillings. Further exemplary filling formulations are given hereinbelow in Examples 1 and 2.

Notwithstanding whether or not the fillings comprise an amount of one or more sugars, the fillings of the present invention may optionally comprise an amount of a liquid sweetener, e.g., a syrup. If included, such a liquid sweetener desirably enhances the organoleptic characteristics of the fillings of the present invention. That is, such liquid sweeteners can be included to impart a moist appearance and texture, as well as a cohesiveness, to the fillings. Such liquid sweeteners also advantageously contribute an amount of moisture to the fillings, and thus, can have a direct impact on the water activity of the filling. Examples of liquid sweeteners suitable for use in the present invention include, but are not limited to, corn syrup, high fructose corn syrup (FFCS), maple syrup, honey, molasses, high maltose corn syrup, combinations of these and the like. One example of a particularly preferred liquid sweetener, if a liquid sweetener is to be included in the fillings, is high fructose corn syrup.

The amount of the liquid sweetener to be included will again depend upon the particular liquid sweetener utilized and the desired end application of the fillings. As a lower limit, at least enough of the liquid sweetener should be included to at least minimally provide the aforementioned benefits while as an upper limit, not so much liquid sweetener should be included so that the handling or organoleptic properties of the fillings are substantially adversely affected. Also, the amount of liquid sweetener will desirably be optimized in light of its contribution, if any, to the water activity of the filling. Generally speaking then, if a liquid sweetener is to be included in the fillings, it is desirably included in the fillings in an amount ranging from about 5% to about 40%, more preferably, from about 10% to about 35%.

Due to the inclusion of the indirectly acting water activity impacting ingredients, e.g., fats and viscosity controlling agents, and the action of such ingredients when included in the fillings of the present invention, additional moisture can optionally be added to the fillings. Such additional moisture then in turn acts as a directly acting water activity impacting ingredient, i.e., acts to raise the water activity of the filling. Moreover, the inclusion of such amounts of moisture can also provide the filling with desirable organoleptic properties, such as a moist taste, texture and/or appearance. Thus, the fillings of the present invention may optionally comprise an amount of a consumable liquid effective to impart said desirable qualities.

Any consumable liquid can be utilized in the present inventive fillings, and examples of suitable consumable liquids include, but are not limited to, juice, water and/or milk. The particular consumable liquid will depend upon the desired end-use application. Additionally, the particular amount of liquid to be utilized will depend on the particular liquid chosen, the filling in which it is to be utilized, and the dough product into which the filling is to be incorporated. However, generally speaking, such liquids, when included in the fillings of the present invention, desirably have the effect of increasing the water activity of the filling, thereby further reducing the moisture migration that may otherwise take place between the filling and the dough. Thus, if such a consumable liquid (or combination of liquids) is to be included in the fillings of the present invention, it is desirably included in at least an amount effective to increase the water activity of the filling and/or to provide a moister tasting product. As an upper limit, not so much of the consumable liquid should be included so that the otherwise advantageous organoleptic and handling characteristics of the fillings are substantially negatively impacted. Further, if to be included, the consumable liquid is desriably included in an amount that is capable of impacting the water activity of the filling. Bearing these considerations in mind, and for exemplary purposes, when such a consumable liquid is desirably included in the fillings of the present invention, it is desirably included in amounts ranging from about 1% to 35%, more preferably from about 5% to about 25%.

The fillings of the present invention may additionally comprise any of a variety of optional materials to modify the nutritional, organoleptic, or other properties of the filling and/or dough product. For example, the present inventive fillings may optionally further include sugar replacers or bulking agents. Additionally, synthetic and natural flavorings or coloring agents may be utilized in the fillings of the present invention. Exemplary flavors include spices, cream or cream cheese flavor, milk powder, chocolate, vanilla extract, vanilla powder, cocoa substitute, hazelnut, dutched cocoa, mint, lemon, orange and mixtures thereof Also, flavor materials and particulates, such as fruit and fruit extracts, nuts, chocolate and other types of flavored chips and the like, can be added to the filling as desired.

Other additives that may optionally be utilized in the fillings of the present invention include, for example: salt; whiteners, such as titanium dioxide; anti-microbial agents, such as potassium sorbate, sorbic acid, dehydroacetic acid, sodium benzoate, and the like; sequestering agents; acidulants; buffers; food acids; preservatives; antioxidants, such as butylated hydroxytoluene, butylated hydroxyanisole, and the like; as well as vitamins and minerals.

Sequestering agents are often used to control the concentration of radical species (e.g., $Cu^{++}$, $Fe^{++}$), which can have a deleterious effect on the color of the filling. A common sequestering agent is an alkali metal pyrophosphate, such as sodium acid pyrophosphate.

Acidulants, such as citric, acetic, tartaric and phosphoric acids can also provide pH control, and function in other capacities as well. For example, citric acid, in addition to being useful for pH control, can also be used to activate potassium sorbate for mold control, to counter the alkalinity of cocoa used in a chocolate formulation, and to impart a tart flavor to the filling.

No matter what combination of ingredients are used for providing the desired taste, or any other property, any of those that are water activity impacting ingredients can desirably and advantageously be balanced with the other ingredients in accordance with the present invention to not only provide the filling with the desired organoleptic properties, but also to provide the filling with the desired water activity.

The present inventive fillings are not only advantageous in that they can be utilized to prepare dough products stable to periods of prolonged refrigerated storage and baking, but also in that the fillings themselves are very easy to prepare. That is, unlike some prior art fillings intended to be useful in dough products that are subjected to prolonged storage, the fillings of the present invention are prepared simply by combining the desired combination of ingredients, i.e., they are not emulsified. The order in which the ingredients are combined is not particularly restricted, nor is the temperature of the ingredients, or the mixing time and method. This is a particularly advantageous aspect of the fillings of the present invention because, unlike many prior art fillings, and in particular, prior art emulsion fillings, special equipment is not required to prepare the fillings of the present invention. In fact, the fillings of the present invention are extremely stable to processing conditions, such as high heat or shear, unlike many prior art fillings. Furthermore, once prepared, the fillings may be stored for prolonged periods of time until they are to be used without substantial degradation of the quality of the filling. Again, this is in contrast to prior art emulsion fillings that, once prepared, must generally be utilized quickly before the emulsion becomes unstabilized and separates.

Thus, for illustrative purposes only, the following exemplary process of preparing a filling in accordance is provided. Any dry components, e.g., sugar or the viscosity controlling agent, to be utilized in the filling can be mixed together. The fat is then added, and advantageously may be heated to a temperature at which the fat is more fluid to aid in mixing, and the combination mixed until substantially uniform. If a liquid sweetener is to be included in the filling, it is desirably added next and also may be heated to aid in its incorporation into the filling. Any other flavors and/or additives desirably included in the filling may then be added along with other liquid ingredients and the filling mixed until uniform. If the filling has been heated by virtue of the inclusion of heated ingredients, the filling is desirably cooled to approximately ambient temperature before being applied to a dough product. Alternatively, the filling may be stored in refrigerated conditions until it is desirably used.

The fillings of the present invention are advantageously utilized in conjunction with doughs to provide filled dough products that are not only stable, but also bake stable so that when the dough products are baked or otherwise cooked, baked dough products with excellent visual and organoleptic properties are produced. The types of doughs with which the fillings may be utilized and the particular formulation thereof is not critical to the practice of the present invention, but rather, the fillings of the present invention can be utilized with any type of dough to form any dough product that is desirably filled. However, the fillings of the present invention prove particularly advantageously when used to form dough products that are contemplated to be in storage for prolonged periods of time, e.g., refrigerated (stored at a temperature of from about 35° F. to about 45° F.) or frozen (stored at a temperature of about 10° F. or less) dough products. Examples of dough products that may be prepared using the fillings of the present invention thus include, but are not limited to, doughnuts, Danishes, toaster pastries, coffeecakes, sweet rolls, Bismarcks, cookies, bagels, biscuits, scones, dinner rolls, breads, croissants, egg twists, bread sticks, and the like. Formulations of such dough products, in addition to being well known to those of ordinary skill in the art, are also described in a voluminous number of commercially available references. As mentioned hereinabove, such doughs typically have water activities of 0.90 or greater.

The manner in which the fillings of the present invention are applied to doughs to provide dough products is not critical, and will depend on the desired configuration of the dough product. That is, the filling can be provided on the surface of the dough, e.g., as to provide a Bismarck. Also, the filling may be rolled into the dough, so that the filling is distributed in a torroidal pattern substantially within the resulting dough product, so as to provide, e.g., a cinnamon roll. Alternatively, the filling may be substantially enclosed within the dough so as to provide, e.g., a filled croissant, a filled doughnut, and the like. The invention is not restricted to the particularly mentioned configurations, rather, other known or developed configurations are also contemplated.

Furthermore, and unlike prior art filling compositions comprising amounts of gels and/or starches without the concurrent inclusion of an amount of fat, the fillings of the present invention can have a consistency that renders them easy not only for the manufacturer to prepare, but also for the manufacturer to apply to dough products. That is, prior art formulations can be too stiff to be easily applied in a cooled state, and typically must be heated in order to liquefy them so that they may be applied to dough products. Unfortunately, applying such a liquid filling to a dough can result in the dough becoming slippery and difficult to shape and subsequently package. In contrast, fillings of the present invention can have a creamy texture that allows them to be readily and easily applied to any dough product in any desired product configuration without liquefying them, i.e., the fillings are easily applied at room temperature, and thus, the present inventive fillings avoid the degradation in product quality that can occur when a liquefied filling is applied to a dough product.

Once a dough product in accordance with the present invention has been prepared, it advantageously may be stored for a prolonged period of time, i.e., for up to 90 days or more at refrigerated temperatures or lower, without suffering a substantial degradation in the quality of the filling, dough or overall dough product. In particular, even though fillings of the present invention are very moist, no substantial moisture migration of any significance occurs between the filling and the dough product; there is no substantial color degradation of the filling; and there is little to no sogginess in the dough product that is filled. Importantly, structural integrity is also preserved, with very little or no filling leakage exhibited.

The present invention will be described below with reference to the following representative examples, wherein unless otherwise indicated, all percentages are weight percentages based upon the total weight of the filling, all ingredients are at substantially ambient temperature, and all mixing was carried out with a Hobart mixer. Furthermore, although the following examples illustrate the invention by the description of the production of a cinnamon filling and cinnamon rolls, other dough products are also within the scope of the invention, such as, for example, doughnuts, Danishes, toaster pastries, coffeecakes, sweet rolls, Bismarcks, cookies, bagels, biscuits, scones, dinner rolls, breads, croissants, egg twists, bread sticks, and the like.

EXAMPLE 1

This example was conducted to show exemplary formulations of cinnamon fillings, savory fillings and fillings comprising juice as the consumable liquid rather than water and to show the average water activities of a variety of exemplary fillings in accordance with the present invention. Specifically, five non-emulsion based, moisture containing fillings in accordance with the present invention, as well as one control, were prepared according to the following formulations and utilizing the following processes:

TABLE 1

Non-Emulsion Based, Moisture Containing Filling Formulations

| Ingredient | 1 No alginate-control | 2 | 3 | 4 | 5 | 6 |
|---|---|---|---|---|---|---|
| HFCS | 25.0 | 9.5 | 10.0 | | 12.5 | 12.5 |
| Dextrose | 25.0 | 33.0 | | | 7.5 | 30.0 |
| Sucrose | | | 34.0 | 39.0 | | |
| Shortening | 45.0 | 35.0 | 35.0 | 35.0 | 44.0 | 35.0 |
| Water | | 6.5 | 5.0 | 20.0 | 12.5 | |
| Fruit Juice | | | | | | 20.0 |
| Cheese powder | | | | | 10.0 | |
| Corn Syrup Solids | | | | | 10.0 | |
| Cinnamon and/or Flavor | 5.0 | 5.5 | 5.2 | 4.0 | | 0.5 |
| Sodium Alginate | | 0.5 | 0.8 | 2.0 | 2.0 | 2.0 |
| Salt | | | | | 1.5 | |
| Total | 100.00 | 100.0 | 100.0 | 100.0 | 100.0 | 100.0 |
| Avg. Aw | 0.501 | 0.787 | 0.814 | 0.823 | 0.790 | 0.814 |

The filling formulations were prepared by first adding the shortening (at 140° F.) to the mixing bowl. The alginate (if used) was then added and the combination mixed for 60 seconds. Then, the cinnamon was added (if called for in the formulation) and the combination mixed until uniform, about 30 seconds. The dextrose or sucrose was then added and again, the combination mixed until uniform, for about 30 seconds. The high fructose corn syrup was then added, followed by the flavor, cheese powder (if used) and water (at 120° F.) and the filling mixed for 60 seconds, or until the filling was uniformly mixed. All formulations mixed easily.

This example shows that the fillings of the present invention are easily prepared and further shows that the inclusion of a viscosity controlling agent, in this instance the hydrocolloid gum alginate, results in an increase in water activity of at least about 0.28, relative to a similar filling not comprising a viscosity controlling agent. This effect was seen in sweet fillings (formulations 2, 3 and 4), a savory filling (formulation 5) and a fruit based filling (formulation 6).

EXAMPLE 2

This example was conducted to show exemplary formulations of the fillings of the present invention as well as to evaluate the shelf stability of the fillings. Specifically, eight non-emulsion based, moisture containing fillings in accordance with the present invention were prepared according to the following formulations and utilizing the following processes:

TABLE 2

Non-Emulsion Based, Moisture-Containing Filling Formulations

| Ingredient | Formulation # | | | | | | | |
|---|---|---|---|---|---|---|---|---|
| Wt % | 1 | 2 | 3 | 4 | 5 | 6 | 7 | 8 |
| HFCS | 19.5 | 19.5 | 35.2 | 35.2 | 20.2 | 20.2 | 35.9 | 35.9 |
| Dextrose | 32.9 | | 32.9 | | 32.9 | | 32.9 | |
| Sucrose | | 29.9 | | 29.9 | | 29.9 | | 29.9 |
| Shortening | 35.0 | 35.0 | 20.0 | 20.0 | 35.0 | 35.0 | 20.0 | 20.0 |
| Water | 6.5 | 9.5 | 5.8 | 8.8 | 6.5 | 9.5 | 5.8 | 8.8 |
| Cinnamon | 4.9 | 4.9 | 4.9 | 4.9 | 4.9 | 4.9 | 4.9 | 4.9 |
| Sodium Alginate | 0.75 | 0.75 | 0.75 | 0.75 | | | | |
| Flavor | 0.5 | 0.5 | 0.5 | 0.5 | 0.5 | 0.5 | 0.5 | 0.50 |
| Total | 100.0 | 100.0 | 100.0 | 100.0 | 100.0 | 100.0 | 100.0 | 100.0 |
| Aw | 0.837 | 0.771 | 0.819 | 0.754 | 0.832 | 0.768 | 0.821 | 0.724 |

The filling formulations were prepared by first adding the shortening (at 140° F.) to the mixing bowl. The alginate (if used) was then added and the combination mixed for 60 seconds. Then, the cinnamon was added (if used) and the combination mixed until uniform, about 30 seconds. The dextrose or sucrose was then added and again, the combination mixed until uniform, for about 30 seconds. The high fructose corn syrup was then added, followed by the flavor and water (at 120° F.) and the filling mixed for 60 seconds, or until the filling was uniform. All formulations mixed easily.

The fillings were then stored for 2 days at 70° F. and the following observations made:

TABLE 3

Filling Appearance after 2 days at 70° F.

| Formulation | Separation | Texture |
|---|---|---|
| 1 | No | Grainy, sticky, spreadable |
| 2 | No | Soft |
| 3 | No | Firm rubber, dry to touch |
| 4 | No | Soft rubber, sticky |
| 5 | Yes | Very soft, almost fluid |
| 6 | Yes | Very soft, almost fluid |
| 7 | Yes | Very soft, almost fluid |
| 8 | Yes | Very soft, almost fluid |

Specifically, it was observed that water activities of 0.724 or greater could be achieved by utilizing a combination of at least two water activity impacting ingredients, i.e., as by the inclusion of fat, sugar, and the viscosity controlling agent alginate as shown by formulations 1–4, or alternatively, by the inclusion of fat, sugar and water as is shown by formulations 5–8. Additionally, these formulations show that a higher water activity can be achieved via the inclusion of dextrose in the fillings of the present invention relative to fillings comprising an amount of sucrose. See, e.g., formulations 1 and 2. Additionally, although separation was seen in formulations 5–8, these fillings yet provided a desirable consistency. Furthermore, the inclusion of an amount of a viscosity controlling agent can eliminate such separation, if desired. Thus, this example shows that, unlike fillings not comprising an amount of alginate, the fillings of the present invention are stable and have mechanical properties that would allow them to be easily applied to a variety of dough products.

EXAMPLE 3

This example was conducted to evaluate the impact of the fillings of the present invention on the product quality of dough products into which the filling is incorporated after a period of storage when raw, and then when subsequently baked. Specifically, the fillings prepared in Example 2 were used to prepare cinnamon rolls using the fillings in an amount of 18% and a conventional sweet roll dough in an amount of 82%. For each formulation, an amount of dough was sheeted to a thickness of between about 3 mm and about 6 mm and cut into 5" by 18" dough pads with 1" perforations lengthwise. Next, the fillings were deposited onto the dough pads and spread evenly across the dough pads and the dough pads rolled to form rolled dough cylinders which were subsequently packaged in cans. After two (2), four (4) weeks and eight (8), during which time the cans were stored at 40° F., representative rolls from cans from each formulation were removed from storage, baked and the following observations made:

TABLE 4

Observations on Rolls after 2 Weeks of Storage

| | |--------RAW--------| | |----------------BAKED----------------| | |
|---|---|---|---|---|---|
| Formulation | Syruping[1] | Dough Handling[2] | Pan Pooling[3] | Baked Appearance | Eating Quality |
| 1 | 0 | 5 | 1 | flaky | very moist, slippery |
| 2 | 0 | 4 | 1 | slightly shinny | very moist |
| 3 | 0 | 2 | 2 | very caramel-y | very wet |
| 4 | 1 | 3 | 4 | very caramel-y | very wet |
| 5 | 0 | 4 | 2 | gooey | not measured (NM) |
| 6 | 0 | 2 | 2 | somewhat dry | NM |
| 7 | 3 | 3 | 2 | gooey | NM |
| 8 | 3 | 1 | 4 | somewhat dry | NM |

[1]Syruping scale: 0 (none)–5 (very excessive)
[2]Dough Handling scale: 1(very messy)–5 (very clean)
[3]Pan Pooling scale: 0(none)–5 (excessive)

TABLE 5

Observations on Rolls after 4 Weeks of Storage

| | |--------RAW--------| | |----------------BAKED----------------| | |
|---|---|---|---|---|---|
| Formulation | Syruping[1] | Dough Handling[2] | Pan Pooling[3] | Baked Appearance | Eating Quality |
| 1 | 0 | 5 | 1 | flakey | very moist, slippery |
| 2 | 0 | 3 | 2 | gooey | slippery |
| 3 | 0 | 3 | 2 | gooey | wet |
| 4 | 2 | 2 | 3 | gooey | wet |
| 5 | 0 | 3 | 2 | dry | crispy surface |

TABLE 5-continued

Observations on Rolls after 4 Weeks of Storage

| | |--------RAW--------| | |----------------BAKED----------------| |
|---|---|---|---|---|---|
| Formu-<br>lation | Syrup-<br>ing[1] | Dough<br>Handling[2] | Pan<br>Pooling[3] | Baked<br>Appearance | Eating<br>Quality |
| 6 | 0 | 4 | 2 | dry | crispy surface |
| 7 | 3 | 3 | 3 | dry | crispy surface |
| 8 | 5 | 1 | 2 | dry | crispy surface |

[1]Syruping scale: 0 (none)–5 (very excessive)
[2]Dough Handling scale: 1(very messy)–5 (very clean)
[3]Pan Pooling scale: 0(none)–5 (excessive)

TABLE 6

Observations on Rolls after 8 Weeks of Storage

| | |--------RAW--------| | |----------------BAKED----------------| |
|---|---|---|---|---|---|
| Formu-<br>lation | Syrup-<br>ing[1] | Dough<br>Handling[2] | Pan<br>Pooling | Baked<br>Appearance | Eating<br>Quality |
| 1 | 0 | 5 | 1 | slightly shiney | moist, slippery |
| 2 | 0 | 4 | 2 | very gooey | slippery |
| 3 | 0 | 4 | 1 | very gooey | wet |
| 4 | 0 | 4 | 2 | shiney, gooey | wet |
| 5 | 0 | 4 | 1 | crunchy | crispy surface |
| 6 | 0 | 4 | 2 | crunchy | crispy surface |
| 7 | 1 | 3 | 1 | crunchy | crispy outside, wet inside |
| 8 | 5 | 2 | 2 | crunchy | crispy surface |

[1]Syruping scale: 0 (none)–5 (very excessive)
[2]Dough Handling scale: 1(very messy)–5 (very clean)
[3]Pan Pooling scale: 0(none)–5 (excessive)

As is shown in Tables 4–6, the rolls prepared with the fillings in accordance with the present invention, i.e., formulas 1–7, had desirable physical and organoleptic properties in both the raw and cooked state. That is, these formulations incorporated one or more water activity impacting ingredients that were proportioned so as to provide a water activity of 0.725. In contrast, formula 8, which comprises a low amount of shortening, no alginate and sucrose rather than dextrose, did not have a high enough water activity to avoid syruping over periods of prolonged storage. Thus, this example shows that the fillings of the present invention may be utilized in dough products that are stored for prolonged periods of time and then cooked, without having a detrimental effect on the dough product when cooked.

EXAMPLE 4

This example was conducted to evaluate the long term stability of dough products in accordance with the present invention. Specifically, three fillings in accordance with the present invention were prepared according to the following formulations, and using the process described hereinabove in Examples 1 and 2.

TABLE 7

Non-Emulsion Based Moisture-Containing Filing Formulations

| | Formulation # | | |
|---|---|---|---|
| Ingredient (wt %) | 1 | 2 | 3 |
| HFCS | 9.6 | 148 | 18.5 |
| Dextrose | 33.1 | 341 | |
| Powdered Sugar | | | 34.1 |

TABLE 7-continued

Non-Emulsion Based Moisture-Containing Filing Formulations

| | Formulation # | | |
|---|---|---|---|
| Ingredient (wt %) | 1 | 2 | 3 |
| Shortening | 35.0 | 35.0 | 35.0 |
| Cinnamon | 4.9 | 4.85 | 4.9 |
| Sodium Alginate | 0.50 | 0.75 | 0.50 |
| Water | 5.50 | 10.0 | 6.50 |
| Flavor | 0.50 | 0.50 | 0.50 |
| Total | 100.0 | 100.0 | 100.0 |
| Aw | 0.817 | 0.841 | 0.730 |

These three filling formulations were then used to produced cinnamon rolls using a conventional dough at 82% and the filling at 18% as described hereinabove in Example 3. At three (3), six (6) and twelve (12) weeks, representative rolls of each formulation were removed from the cans and baked and the following observations made.

TABLE 8

Observations on Rolls after 3 Weeks of Storage

| | |----------RAW----------| | |----------BAKED----------| |
|---|---|---|---|
| Formulation | Syruping[1] | Dough Handling[2] | Baked Appearance |
| 1 | 1 | 4 | Gooey, moist appearance, moist texture |
| 2 | 1 | 5 | Glossy, moist appearance |
| 3 | 3 | 4 | Moist appearance, glossy |

[1]Syruping scale: 0 (none)–5 (very excessive)
[2]Dough Handling scale: 1(very messy)–5 (very clean)

TABLE 9

Observations on Rolls after 6 Weeks of Storage

| | |---------RAW---------| | |-----------BAKED-----------| |
|---|---|---|---|
| Formulation | Syruping[1] | Dough Handling[2] | Baked Appearance |
| 1 | 1 | 4 | Gooey, moist appearance |
| 2 | 1.5 | 3.5 | Glossy, moist appearance |
| 3 | 2 | 4 | Filling has appeared to expanded, making it look plentiful |

[1]Syruping scale: 0 (none)–5 (very excessive)
[2]Dough Handling scale: 1(very messy)–5 (very clean)

TABLE 10

Observations on Rolls after 12 Weeks of Storage

| | |------------RAW------------| | |--------BAKED--------| |
|---|---|---|---|
| Formulation | Syruping[1] | Dough Handling[2] | Baked Appearance |
| 1 | 2 | 4 | Very moist, gooey, glossy appearance |
| 2 | 2 | 5 | Very moist, gooey, glossy appearance |
| 3 | 2 | 4 | Very moist, un-ribbon-like appearance |

[1]Syruping scale: 0 (none)–5 (very excessive)
[2]Dough Handling scale: 1 (very messy)–5 (very clean)

As is shown in Tables 8–10, the rolls prepared with the fillings in accordance with the present invention had desirable physical and organoleptic properties in both the raw and cooked states. Thus, this example shows that the fillings of the present invention may be utilized in dough products that are stored for prolonged periods of time, i.e., up to 12 weeks or more, and then cooked, without having a detrimental effect on the dough product when cooked.

All publications, patents and patent documents are incorporated by reference herein, as though individually incorporated by reference. The invention has been described with reference to specific and preferred embodiments and techniques. However, other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A dough product comprising
   (a) a dough having a first water activity; and
   (b) a non-emulsion based, moisture-containing filling comprising at least two water activity impacting ingredients and having a second water activity,
   wherein the first water activity is greater than the second water activity and the second water activity is at least about 0.725.

2. The dough product of claim 1 wherein the dough product is refrigerated or frozen.

3. The dough product of claim 1 wherein the second water activity is at least about 0.80.

4. The dough product of claim 3 wherein the second water activity is at least about 0.85.

5. The dough product of claim 1 wherein the at least two water activity impacting ingredients comprise fat and a viscosity controlling agent.

6. The dough product of claim 5 wherein the viscosity controlling agent comprises a natural or modified starch, a gel-forming protein, a hydrocolloid gum or a combination thereof.

7. The dough product of claim 6 wherein the viscosity controlling agent comprises a hydrocolloid gum.

8. The dough product of claim 7 wherein the viscosity controlling agent comprises alginate.

9. The dough product of claim 7 wherein the hydrocolloid gum is present in the filling in an amount of from about 0.1% to about 5% and the fat is present in the filling in an amount of from about 20% to about 60%.

10. The dough product of claim 1 wherein the at least two water activity impacting ingredients comprise fat and sugar.

11. The dough product of claim 10 wherein the fat is present in the filling in an amount of from about 20% to about 60% and the sugar is present in the filling in an amount of from about 10% to about 50%.

12. A non-emulsion based, moisture-containing filling for a dough product comprising from about 20% to about 60% fat and at least one other water activity impacting ingredient so that the filling has a water activity of at least about 0.725.

13. The filling of claim 12 wherein the at least one other water activity impacting ingredient comprises at least one sugar.

14. The filling of claim 13 wherein the sugar comprises dextrose in an amount of from about 10% to about 50%, based upon the total weight of the filling.

15. The filling of claim 12 wherein the at least one other water activity impacting ingredient comprises a consumable liquid in an amount of from about 1% to about 35%, based upon the total weight of the filling.

16. The filling of claim 12 wherein the filling further comprises a liquid sweetener in an amount of from about 1% to about 35%, based upon the total weight of the filling.

17. The filling of claim 12 wherein the at least one other water activity impacting ingredient comprises a viscosity controlling agent.

18. The filling of claim 17 wherein the viscosity controlling agent comprises a natural or modified starch, a gel-forming protein, a hydrocolloid gum or a combination thereof.

19. The filling of claim 18 wherein the viscosity controlling agent comprises a hydrocolloid gum.

20. The filling of claim 19 wherein the hydrocolloid gum comprises alginate in an amount of from about 0.1% to about 5%, based upon the total weight of the filling.

21. A dough product filled with a non-emulsion based, moisture containing filling comprising from about 20% to about 60% shortening and at least one other water activity impacting ingredient.

22. The filled dough product of claim 21 wherein the at least one other water activity impacting ingredient comprises at least one sugar.

23. The filled dough product of claim 22 wherein the at least one sugar comprises dextrose in an amount of from about 10% to about 50%, based upon the total weight of the filling.

24. The filled dough product of claim 21 wherein the at least one other water activity impacting ingredient comprises a consumable liquid in an amount of from about 1% to about 35%, based upon the total weight of the filling.

25. The filled dough product of claim 21 wherein the filling further comprises a liquid sweetener in an amount of from about 1% to about 35%, based upon the total weight of the filling.

26. The filled dough product of claim 21 wherein the at least one other water activity impacting ingredient comprises a viscosity controlling agent.

27. The filled dough product of claim 26 wherein the viscosity controlling agent comprises a natural or modified starch, a gel-forming protein, a hydrocolloid gum or a combination thereof.

28. The filled dough product of claim 27 wherein the viscosity controlling agent comprises a hydrocolloid gum in an amount of from about 0.1% to about 5%, based upon the total weight of the filling.

29. A method for developing a formulation for a filling for a dough product comprising:
   (a) determining the water activity of a dough which is to be combined with the filling to provide the dough product;
   (b) selecting a plurality of ingredients for the filling;
   (c) proportioning at least two of the plurality of the ingredients to increase the water activity of the filling so that the differential between the water activity of the dough and the water activity of the filling is about 0.25 or less.

30. The method of claim 29 wherein the dough product is a refrigerated dough product.

31. The method of claim 29 wherein the dough product is a cinnamon roll.

32. The method of claim 29 wherein the at least two ingredients comprise fat and a viscosity controlling agent.

33. The method of claim 29 wherein the at least two ingredients comprise fat and sugar.

* * * * *